United States Patent
Boe (10) Patent No.: US 7,432,756 B2
(45) Date of Patent: Oct. 7, 2008

(54) REGULATED CHARGE PUMP CIRCUIT AND APPLICATION IN POWER STAGES EMPLOYING NORMALLY ON POWER SWITCHING DEVICES

(75) Inventor: Ronald Scott Boe, Castaic, CA (US)

(73) Assignee: HR Textron, Inc., Santa Clarita, CA (US)

( * ) Notice: Subject to any disclaimer, the term of this patent is extended or adjusted under 35 U.S.C. 154(b) by 93 days.

(21) Appl. No.: 11/498,502

(22) Filed: Aug. 3, 2006

(65) Prior Publication Data

US 2008/0036531 A1    Feb. 14, 2008

(51) Int. Cl.
*G05F 1/10* (2006.01)
*G05F 3/02* (2006.01)

(52) U.S. Cl. .................. 327/534; 327/536; 327/537

(58) Field of Classification Search .......... 327/534–538
See application file for complete search history.

(56) References Cited

U.S. PATENT DOCUMENTS

| | | | | |
|---|---|---|---|---|
| 5,365,118 A | * | 11/1994 | Wilcox | 327/109 |
| 5,793,596 A | * | 8/1998 | Jordan et al. | 361/98 |
| 5,880,638 A | * | 3/1999 | Schaffer | 330/255 |
| 6,844,779 B2 | | 1/2005 | McEwen | |
| 6,885,225 B2 | * | 4/2005 | Ohmichi et al. | 327/112 |
| 6,888,340 B1 | | 5/2005 | Chen | |
| 6,917,240 B2 | * | 7/2005 | Trafton et al. | 327/540 |
| 2002/0075063 A1 | | 6/2002 | Hwang | |
| 2004/0239408 A1 | | 12/2004 | Chen et al. | |
| 2005/0145699 A1 | | 7/2005 | Zucker et al. | |

OTHER PUBLICATIONS

Kelley R L, et al: "Inherently safe DC/DC converter using a normally-on SiC JFET" Applied Power Electronics Conference and Exposition, 2005. APEC 2005. Twentieth Annual IEEE Austin, TX, USA Mar. 6-10, 2005, Piscataway, NJ, USA, IEEE, US, Mar. 6, 2005, pp. 1561-1565.

Orellana, A., et al: "Fast gate drive for SiC-JFET using a conventional driver for MOSFETs and additional protections" Industrial Electronics Society, 2004. IECON 2004. 30th Annual Conference of IEEE Buscan, South Korea, Nov. 2-6, 2004, Piscataway, NJ, USA, IEEE, Nov. 2, 2004, pp. 938-943.

"Fly-By-Light" Electronics World, Nexus Media Communications, Swanley, Kent, GB, vol. 95, No. 1636, Feb. 1, 1989, p. 188.

* cited by examiner

*Primary Examiner*—Dinh T. Le
(74) *Attorney, Agent, or Firm*—BainwoodHuang (57) ABSTRACT

A charge pump circuit employs an oscillator powered by a variable positive supply voltage, storage and switching circuitry controlled by an oscillator signal from the oscillator, and a regulator that maintains a negative supply voltage generated by the storage and switching circuitry at a target value through control of the variable positive supply voltage. The charge pump can be used in a power stage employing normally on switching transistors (such as silicon carbide junction FETs or SiC JFETs) that require a negative voltage to be turned completely off. Such power stages are in turn useful in applications including military aerospace applications having harsh electromagnetic interference (EMI) conditions, where they may be controlled by optical control signals conveyed by optical fibers from a more benign operating environment within the body of an aircraft.

9 Claims, 7 Drawing Sheets

REGULATED CHARGE PUMP CIRCUIT AND APPLICATION IN POWER STAGES EMPLOYING NORMALLY ON POWER SWITCHING DEVICES

BACKGROUND

The present invention relates to the field of power supply circuits, and more particularly to charge pumps and switching power stages employing charge pumps.

There are a variety of applications employing power stages utilizing high-voltage switching devices, typically field-effect transistors (FETs) in recent times. One or more FETs are coupled between a power source and a load, and control circuitry controls the switching action of each FET in a coordinated manner to achieve a desired operation. Examples include switching DC power supplies in electronic systems, DC motors such as used in aircraft actuators, and other applications. Such systems often include gate drive circuitry for each of the power FETs to provide proper bias and drive levels. Typically the gate drive circuitry for a FET includes smaller switching transistors that receive low-level control signals from the control circuitry and selectively apply relatively large voltages to the gate of the FET to effect the desired switching of load current. In many applications, the control signals provided to the gate drive circuitry are electrical signals generated directly by the control circuitry.

In some applications, it is desired to isolate the high-power electronics from the control circuitry, in which case the control signals may be in the form of optical signals conveyed by an optical fiber for example. Generally, isolation is maintained in order to protect the relatively sensitive control circuitry and signals therein from disruption that might be caused in a more noisy or otherwise hazardous environment in which the high-power circuitry operates. As an example, in military aerospace applications there is a move toward so-called "fly by light" systems in which the control signals that control the operation of heavy-duty actuators for flight surfaces (rudders, flaps etc.) are conveyed in optical form so that the control circuitry remains protected within the body of the aircraft, rather than being exposed to microwave or other electromagnetic interference that may be present outside the aircraft. In these kinds of applications it is necessary for the gate drive circuitry to be responsive to the optical control signal, such as by use of so-called light-sensitive switches (LSSs) or similar technology.

As noted, it is known to use high-power FETs as switching device for delivering power to an electrical load. For many years, there has been widespread use of enhancement-mode N-channel FETs made of doped silicon. More recently, other FET types are being used because of certain advantages they might enjoy over silicon FETs. Currently there is interest in the use of junction FETs (JFETs) based on silicon carbide (SiC) material. In particular, these devices exhibit relatively high immunity to electromagnetic interference (EMI) and high temperature operation, for example, and thus may be better suited for use in hostile EMI environments.

It is known to use circuits called "charge pumps" for a variety of applications. Charge pumps are often used to generate relatively high voltages from much smaller supply voltages, for example. Systems requiring such high operating voltages may include those including gas discharge lamps, semiconductor devices using super-voltages as programming voltages, etc.

SUMMARY

In accordance with the present invention, an improved charge pump is disclosed that may be used in a variety of applications. Also disclosed is a power stage employing normally on switching devices such as SiC JFETs, which have special requirements in which the disclosed charge pump circuit may be advantageously utilized.

In particular, the charge pump is a regulated charge pump capable of generating a regulated negative output voltage from a fixed positive supply voltage. The charge pump includes storage and switching circuitry operative to generate the negative supply voltage based on an oscillator signal, and oscillator circuitry operative to generate the oscillator signal based on a variable positive supply voltage derived from the fixed positive supply voltage. Changes in the variable positive supply voltage result in corresponding changes of the negative supply voltage generated by the storage and switching circuitry. The charge pump further includes a regulator operative to generate the variable positive supply voltage in response to the negative supply voltage to maintain the negative supply voltage at substantially a target regulated value. The charge pump includes (1) a first field-effect transistor (FET) having a gate node and having a source-drain channel coupled between the fixed positive supply voltage and the variable positive supply voltage, and (2) a second FET having a gate node coupled to a ground reference and having a source-drain channel coupled between the gate node of the first FET and the negative supply voltage. Changes in the negative supply voltage are detected as changes in the gate-to-source voltage of the second FET and thus the drive strength of the second FET. The gate voltage of the first FET is driven accordingly, resulting in variation of the variable positive supply voltage that tend to counteract (through the oscillator and storage and switching circuitry) the change in the negative supply voltage. The negative supply voltage produced by the charge pump is maintained at substantially a target value through operation of the disclosed regulator.

A disclosed power stage is utilized to provide switched electrical power to a load, and includes a normally on field-effect transistor (FET) having a gate node and having a high-current source-drain channel connected between the load and a ground reference of the power stage. Examples of such a normally on FET include SiC JFETs such as might be utilized for greater EMI immunity in a hostile EMI environment. The power stage also includes a gate drive circuit having a negative supply input and a control output, the control output being coupled to the gate node of the normally on FET. The gate drive circuit includes a low-side switching device coupled between the control output and a negative supply input, the low-side switching device being operative to drive the voltage of the gate node of the normally on FET to substantially the value of a negative supply voltage appearing on the negative supply input in response to a switching control signal coupled to the gate drive circuit. The negative supply voltage is sufficiently negative with respect to the ground reference of the power stage to substantially turn off the normally on FET. A regulated charge pump circuit generates the negative supply voltage from a fixed positive supply voltage of the power stage. The regulated charge pump circuit includes (1) storage and switching circuitry operative to generate the negative supply voltage based on an oscillator signal, (2) oscillator circuitry operative to generate the oscillator signal based on a variable positive supply voltage derived from the fixed positive supply voltage. Changes in the variable positive supply voltage result in corresponding changes of the negative supply voltage generated by the storage and switching circuitry, and (3) a regulator operative to generate the variable positive supply voltage in response to the negative supply voltage to maintain the negative supply voltage at substantially a target regulated value. Thus, the use of SiC JFETs and similar devices in a power stage is accommodated through use of the disclosed regulated charge pump circuit.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
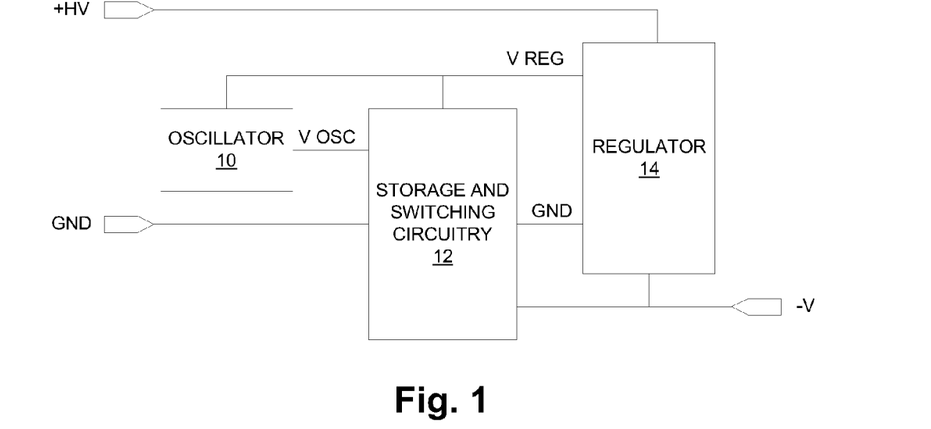
FIG. 1 is a block diagram of a regulated charge pump circuit in accordance with the present invention.

FIG. 1 shows a regulated charge pump circuit that operates from a fixed positive supply voltage +HV and a ground reference GND. An oscillator 10 is connected between GND and a variable positive supply voltage V REG. The oscillator 10 generates an oscillator signal V OSC. Storage and switching circuitry 12 receives V REG, GND, and V OSC, and generates a negative supply voltage −V. A regulator 14 is coupled between +HV and −V and generates V REG for use by the oscillator 10 and storage and switching circuitry 12. In operation, V OSC controls the storage and switching circuitry to produce −V. The regulator 14 operates in response to the value of −V to control the value of V REG accordingly, such that −V is maintained at substantially a target value. More details of the operation are presented below in the context of specific embodiments of the generalized circuit of FIG. 1.

In one embodiment, the regulated charge pump circuit of FIG. 1 may be used in a relatively high-voltage application such as forming part of a power stage for control of a mechanical actuator in an aircraft. In such an embodiment, the value of +HV may be on the order of +270 volts, which is commonly employed as a fixed positive supply voltage in aircraft. The value of −V in such an embodiment may be on the order of −10 to −30 volts, depending in part on the characteristics of the power switching devices that are utilized in the power stage. Advantageously, the regulated charge pump circuit may be used in conjunction with certain types of power field-effect transistors (FETs), namely silicon-carbide (SiC) junction FETs (JFETs) which have certain advantages over other types of power FETs (including silicon FETs) in some applications. More details are presented below.

FIGS. 2 through 5 present a first embodiment of the general circuit of FIG. 1.

Figure 2:
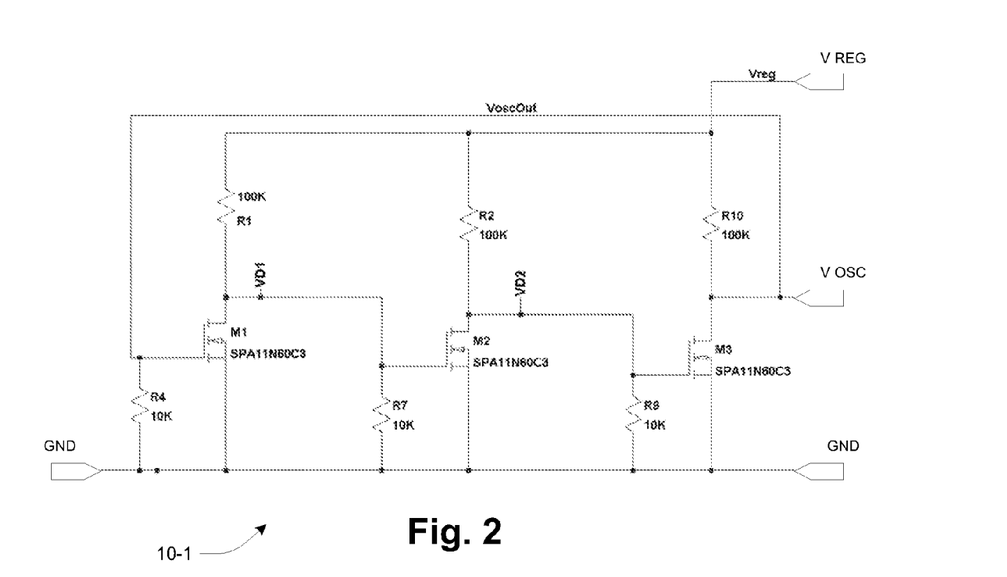
FIG. 2 is a schematic diagram of an oscillator in the charge pump circuit of FIG. 1 according to a first embodiment.

FIG. 2 is a schematic diagram of an oscillator 10-1. The general form is that of a three-stage ring oscillator, with each of the transistors M1, M2 and M3 and its associated circuitry forming one of the stages. The frequency of the oscillator signal V OSC is determined in part by the value of the variable positive supply voltage V REG. The frequency of V OSC tracks V REG in a positive relationship, i.e., higher values of V REG result in higher frequency, and lower values of V REG result in lower frequency. In the embodiment of FIGS. 2-5, the frequency of V OSC is on the order of 10 KHz, and its amplitude is on the order of 20 volts.

Figure 3:
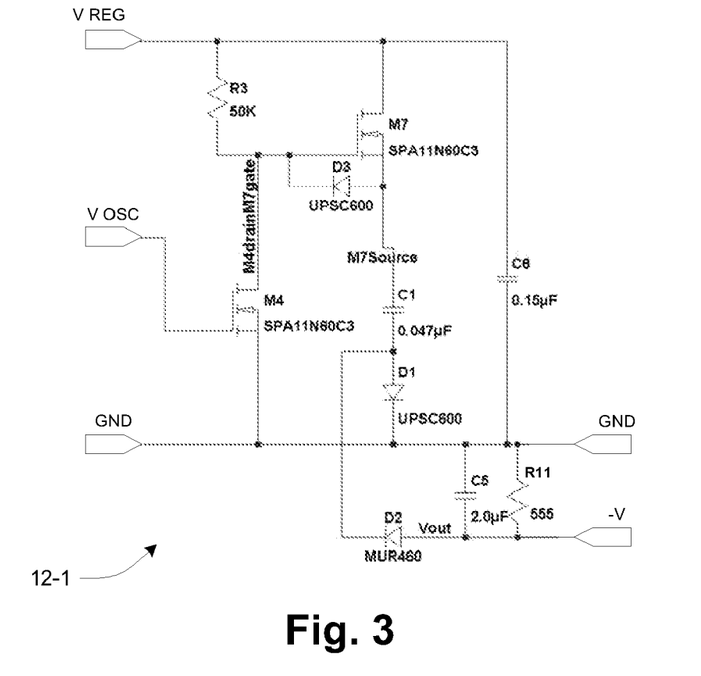
FIG. 3 is a schematic diagram of storage and switching circuitry in the charge pump circuit of FIG. 1 according to a first embodiment.

FIG. 3 is a schematic diagram of storage and switching circuitry 12-1 according to the first embodiment. Capacitor C1 serves as a flying capacitor that is alternately charged at one voltage level and then discharged at a different voltage level to generate the negative supply voltage −V. Charging occurs when V OSC is low and transistor M4 is off. Transistor M7 is on by action of pull-up resistor R3, and positive charging current flows through M7 and D1. When V OSC is high and transistor M4 is on, the voltage at the top of C1 is pulled toward GND, and thus the voltage at the bottom of C1 is initially driven down to a negative value due to the charge stored on C1. Diode D2 permits discharging current to flow from the node −V. Capacitor C5 and resistor R11 serve as a filter to dampen the response of the voltage −V to the switching action.

Figure 4:
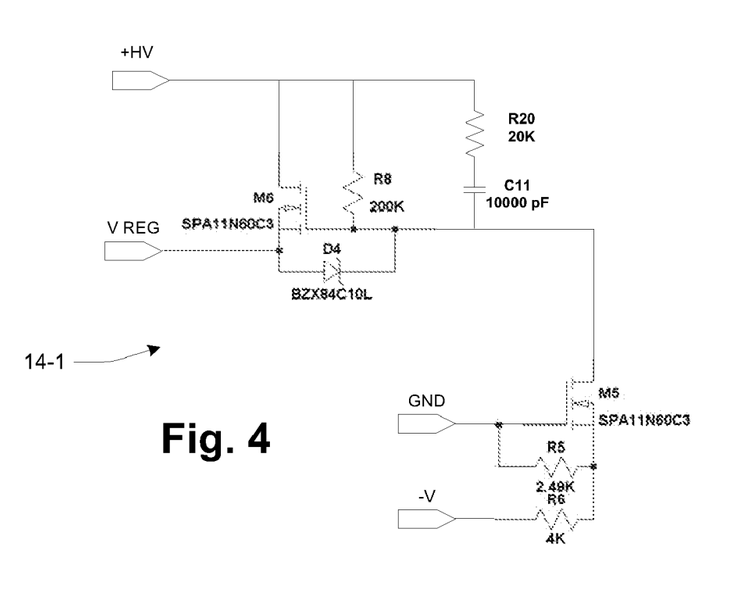
FIG. 4 is a schematic diagram of a regulator in the charge pump circuit of FIG. 1 according to a first embodiment.

FIG. 4 is a schematic of a regulator 14-1 according to the first embodiment. Two transistors M5 and M6 and associated circuitry are utilized in a linear regulation arrangement. The value of −V with respect to GND provides a corresponding gate-to-source voltage for M5, which provides gate drive to M6. As −V becomes more negative and M5 turns on harder, the gate drive to M6 is reduced and thus the voltage V REG falls due to reduced conductance of M6. This results in a lower frequency and amplitude of V OSC and corresponding reduced charge pumping, tending to bring −V more positive. As −V becomes more positive, the opposite occurs throughout the regulator 14-1, i.e., M5 turns on less, driving the gate of M6 higher and thus causing M6 to turn on harder, driving V REG higher and resulting in greater charge pumping that tends to bring −V lower. Capacitor C11 and resistor R20 serve as a filter to control the response characteristic of the regulator 14-1.

Figure 5:
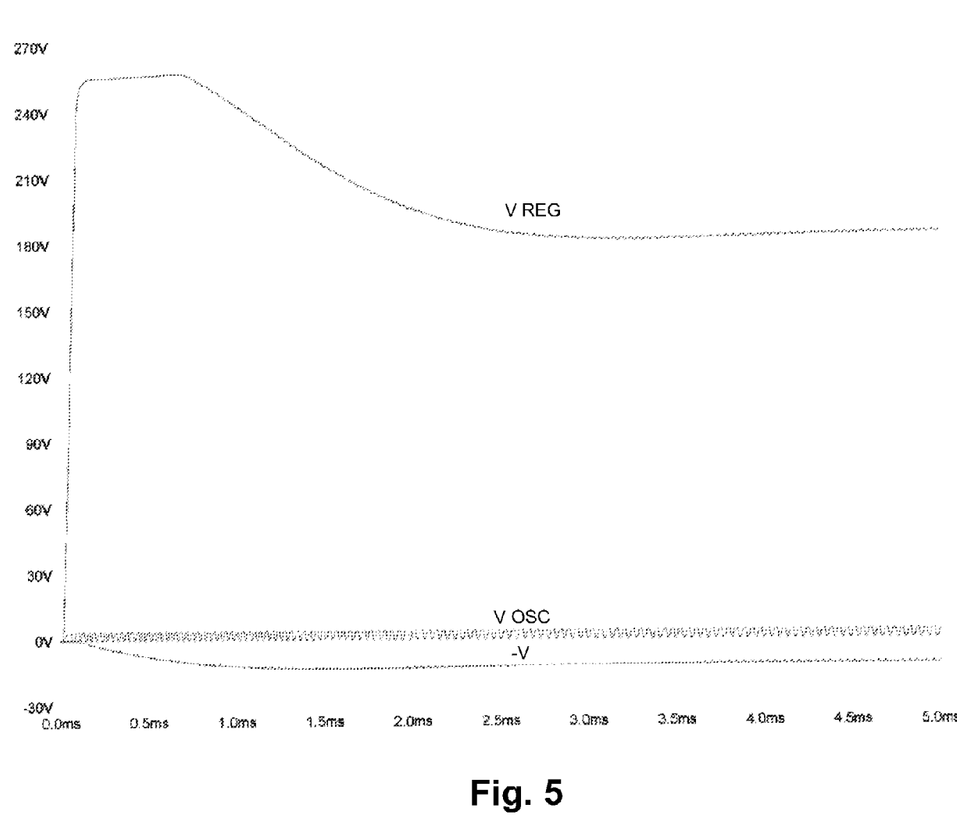
FIG. 5 is a waveform diagram depicting operation of the regulated charge pump circuit of the first embodiment of FIGS. 2-4.

FIG. 5 shows V REG, V OSC and −V during initial operation. At startup, V REG has a high value (near +HV) and −V is initially near GND. −V becomes more negative over an initial period until it is sufficiently negative that the regulator 14-1 kicks in (about 0.7 mS), at which point V REG begins diminishing and −V continues to fall more slowly. V REG and −V reach their respective steady state values of approximately +180 volts and −15 volts after about 2.5 mS.

Figure 6:
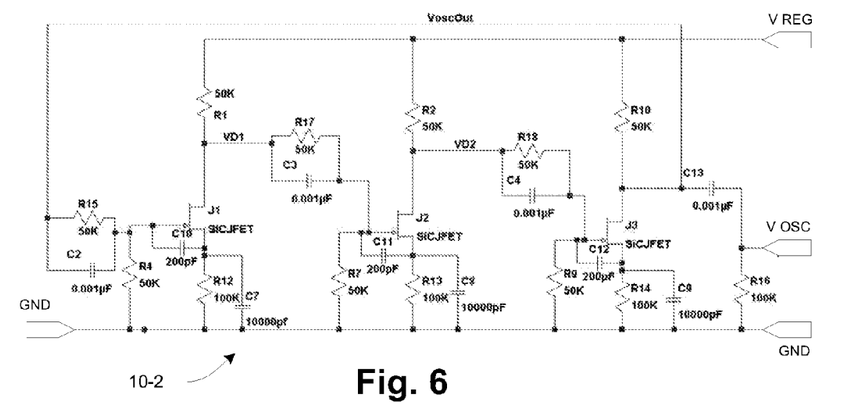
FIG. 6 is a schematic diagram of an oscillator in the charge pump circuit of FIG. 1 according to a second embodiment.
Figure 7:
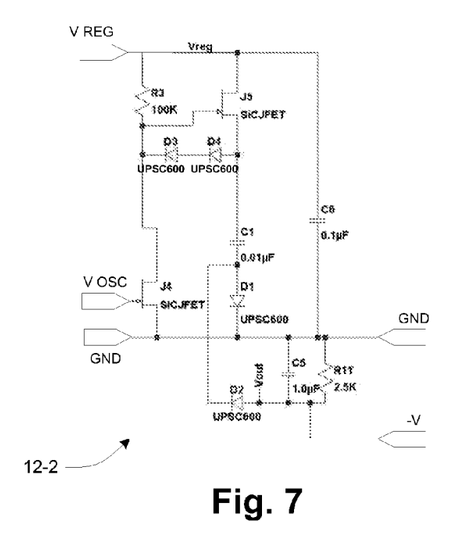
FIG. 7 is a schematic diagram of storage and switching circuitry in the charge pump circuit of FIG. 1 according to a second embodiment.
Figure 8:
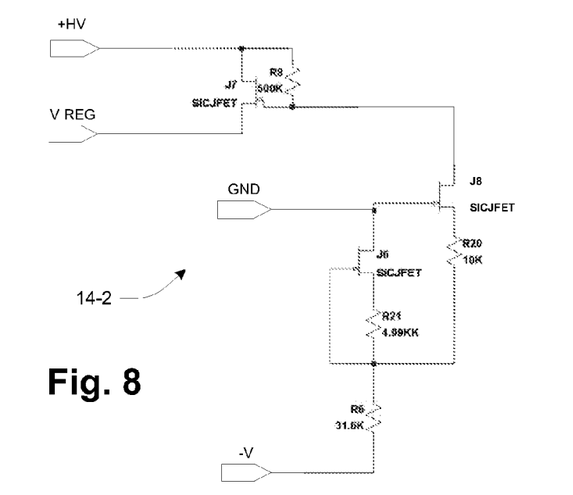
FIG. 8 is a schematic diagram of a regulator in the charge pump circuit of FIG. 1 according to a second embodiment.
Figure 9:
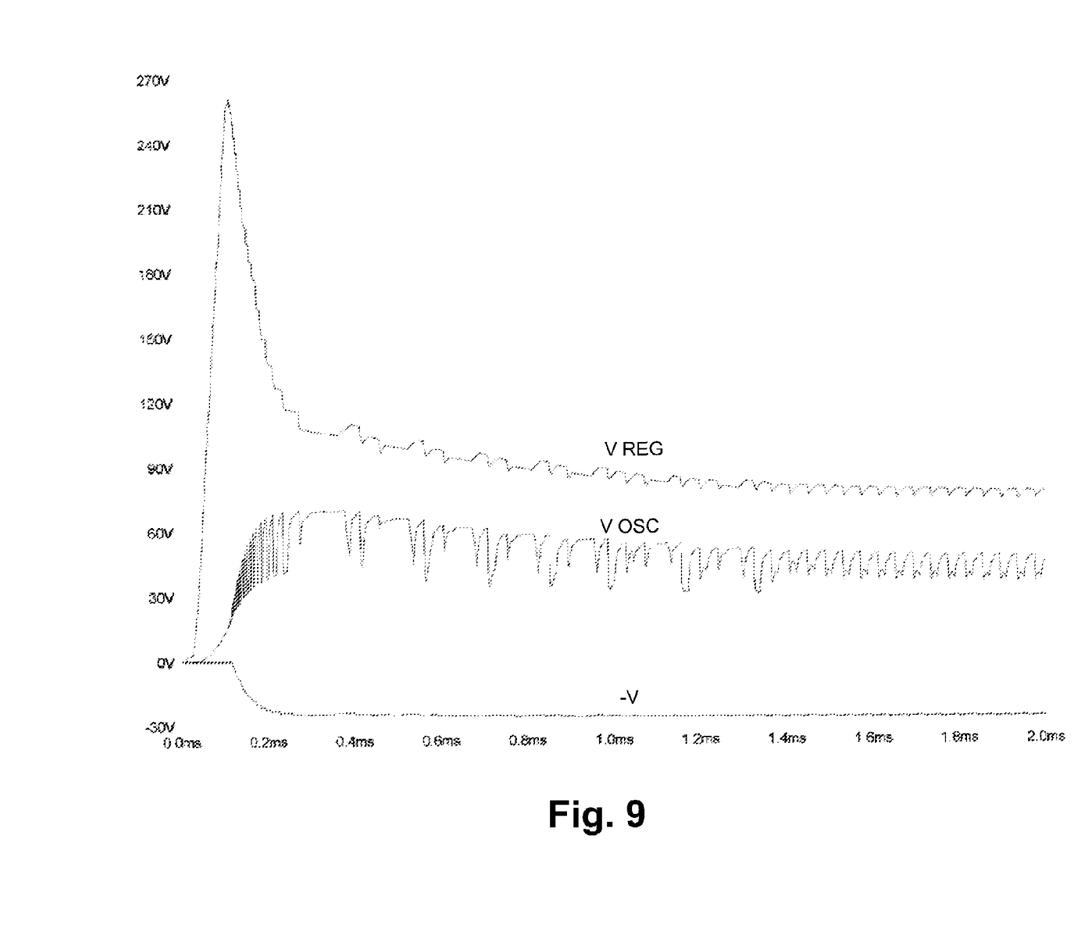
FIG. 9 is a waveform diagram depicting operation of the regulated charge pump circuit of the second embodiment of FIGS. 6-8.

FIGS. 6-8 show a second embodiment of the general circuit of FIG. 1. The overall structure and operation are similar to those of the first embodiment described above. One important difference is the use of SiC JFET transistors in place of silicon MOSFETs as are utilized in the first embodiment. SiC JFETs require a relatively high-amplitude negative gate-to-source voltage to be turned completely off, and thus the internal nodes of the circuits of FIGS. 6-8 operate at relatively high voltages. This aspect of operation is exhibited by V OSC as shown in FIG. 9, having a steady-state DC component of about 45 volts. The SiC JFETs may also require more complicated biasing in some circuits than their silicon counterparts. Otherwise, the circuits of FIGS. 6-8 operate in substantially the same way as those of FIGS. 2-4, as exhibited by the waveform diagram of FIG. 9. In this second embodiment, the steady state value of −V is on the order of −30 volts.

Figures 10, 10A:
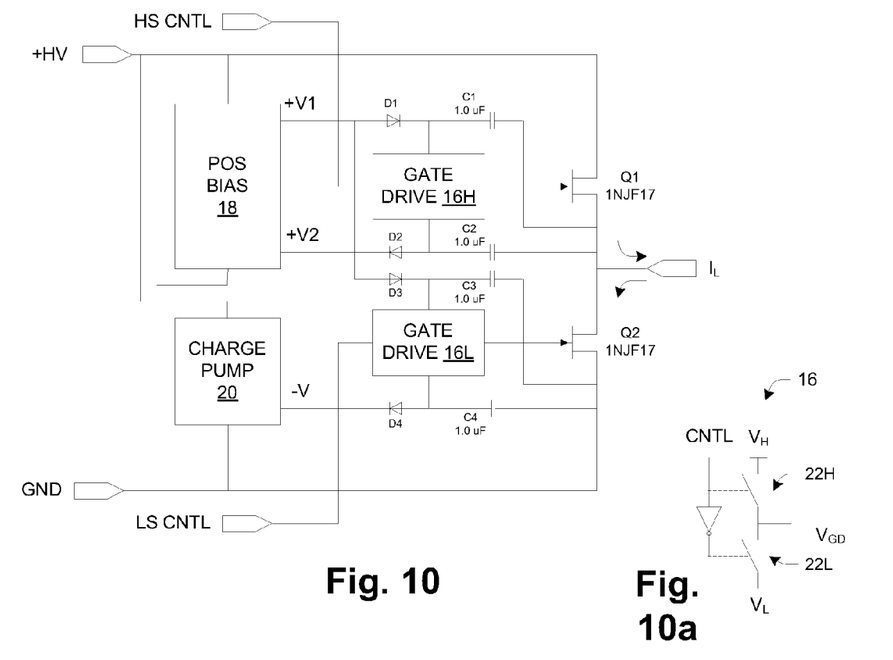
FIG. 10 is a block diagram of a power stage utilizing the regulated charge pump circuit of FIG. 1.
FIG. 10a is a generalized schematic diagram of a gate drive circuit in the power stage of FIG. 10.

FIG. 10 shows a power stage that utilizes a regulated charge pump circuit such as those described above. In particular, the power stage of FIG. 10 has a "half-bridge" configuration with two high-power SiC JFET transistors Q1 and Q2 that provide switched load current $I_L$ to a load (not shown). It is assumed that there is an external source of respective switching control signals HS CNTL and LS CNTL for the two transistors Q1 and Q2. The nature of the control signals HS CNTL and LS CNTL will be dependent on the type of system in which the power stage is used. The power stage of FIG. 10 may constitute one-third of a switched (commutated) power supply for a three-phase DC motor, for example. Numerous other applications of power stage circuitry similar to that shown in FIG. 10 are possible. In one embodiment, the control signals HS CNTL and LS CNTL are optical signals delivered by fiber optic cable, for example, and optically coupled to light sensitive switches (LSSs) within gate drive circuits 16 to generate the gate drive signals for the transistors Q1 and Q2.

The power stage of FIG. 10 includes a high-side gate drive circuit (GATE DRIVE) 16H and a low-side gate drive circuit (GATE DRIVE) 16L, each having a control output coupled to the gate of the respective transistor Q1 or Q2. A positive bias (POS BIAS) circuit 18 and capacitors C1 and C2 operate to provide supply voltages +V1 and +V2 for the high-side gate drive circuit 16H (these also being referred to as upper and lower supply voltages respectively). The voltages +V1 and −V serve as the upper and lower supply voltages for the low-side gate drive circuit 16L, where the voltage −V is generated by a regulated charge pump circuit 20 such as those described above. The high-side gate drive circuit 16H is controlled by the high-side signal HS CNTL, and the low-side gate drive circuit 16L is controlled by the low-side signal LS CNTL.

In operation, the voltages +V1 and +V2 from the POS BIAS circuit 18 are approximately +4 volts and (+HV−20) volts, and the voltage −V from the charge pump circuit 20 is −20 volts. It will be noted that the voltage +V2 is referenced to +HV. The control signals HS CNTL and LS CNTL are non-overlapping pulse signals, such that Q1 is guaranteed to be OFF when Q2 is ON and vice-versa. Each gate drive circuit 16 has a control output coupled to Q1 or Q2 as shown, and operates to make a connection between its control output and either of its supply inputs based on the respective control signal HS CNTL or LS CNTL, causing the switching of Q1 and Q2 in a desired manner.

FIG. 10a depicts a gate drive circuit 16 in generalized form. A high-side switch 22H is coupled between an upper supply input $V_H$ and the control output node $V_{GD}$, and a low-side switch 22L is coupled between the lower supply input $V_L$ and the control output node $V_{GD}$. The switches 22 are controlled by the control input CNTL in a non-overlapping manner. The switches 22 may be implemented using conventional FET switching transistors for example, or using so-called light-sensitive switches (LSSs) that operate directly in response to optical energy coupled thereto, as well as other alternatives.

Figure 11:
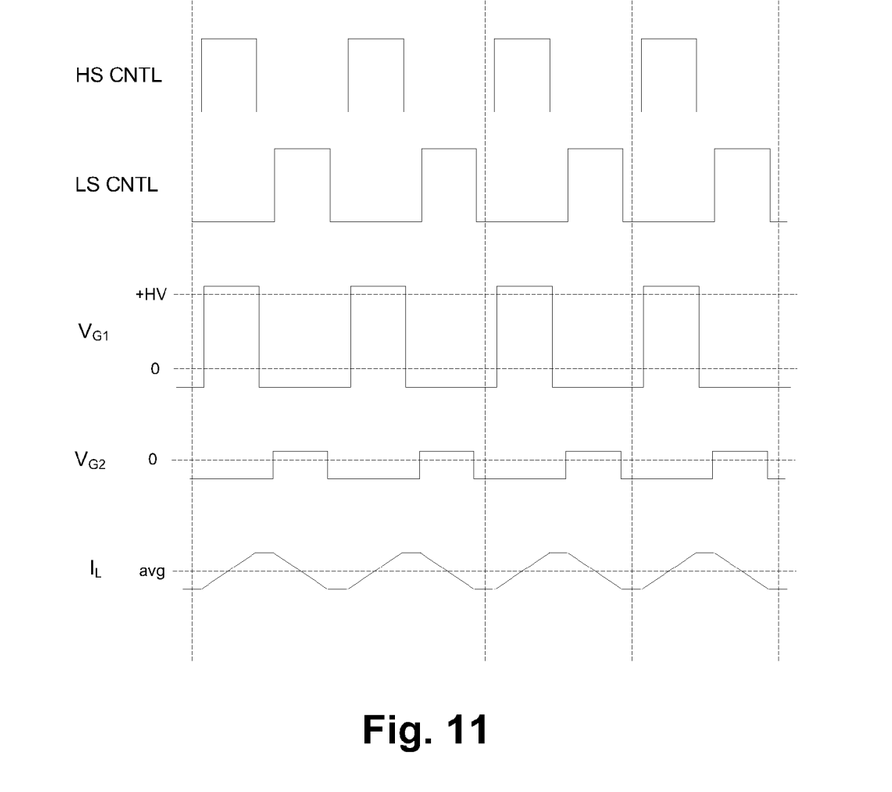
FIG. 11 is a waveform diagram depicting operation of the power stage of FIG. 10.

FIG. 11 illustrates the operation of the power stage of FIG. 10. The gate drive signals for transistors Q1 and Q2 are labeled $V_{G1}$ and $V_{G2}$ respectively. When Q1 is OFF and Q2 is ON, the Q2 gate drive voltage $V_{G2}$ is about +4 volts (+V1) and the voltage at the output node is approximately 0 volts. The capacitor C1 is charged to approximately +4 volts via the diode D1 and Q2. The Q1 gate drive voltage $V_{G1}$ is about −20 volts, due to a charge of −20 volts previously stored on capacitor C2. When Q1 is ON and Q2 is OFF, the voltage of the output node is approximately +HV, and the Q1 gate drive voltage $V_{G1}$ is (+HV+4) due to the 4-volt charge previously stored on C1. The capacitor C2 is charged to approximately −20 volts via Q1 and diode D2. The Q2 gate drive voltage $V_{G2}$ is approximately −20 volts (−V). As shown, the load current $I_L$ exhibits a generally triangular waveform about an average DC value.

While this invention has been particularly shown and described with references to preferred embodiments thereof, it will be understood by those skilled in the art that various changes in form and details may be made therein without departing from the spirit and scope of the invention as defined by the appended claims.

For example, the charge pump circuit of FIG. 1 may be utilized to provide a negative voltage for use with other types of normally on transistors, including gallium nitride (GaN), aluminum-gallium-nitride (AlGaN), gallium arsenide (GaAs), etc. The charge pump circuit may also be used for any of a variety of other applications requiring voltage conversion. For the power stage of FIG. 10, the gate drive circuits 16 may employ light-sensitive switches (LSSs) or more conventional electrically controlled switching devices.

What is claimed is:

1. A power stage for providing switched electrical power to a load, comprising:
    a normally on field-effect transistor (FET) having a gate node and having a high-current source-drain channel connected between the load and a ground reference of the power stage;
    a gate drive circuit having a negative supply input and a control output, the control output being coupled to the gate node of the normally on FET, the gate drive circuit including a low-side switching device coupled between the control output and a negative supply input, the low-side switching device being operative in response to a switching control signal to drive a voltage of the gate node of the normally on FET to substantially a value of a negative supply voltage appearing on the negative supply input, the negative supply voltage being sufficiently negative with respect to the ground reference of the power stage to substantially turn off the normally on FET; and
    a regulated charge pump circuit operative to generate the negative supply voltage from a fixed positive supply voltage of the power stage, the regulated charge pump circuit including (1) storage and switching circuitry operative to generate the negative supply voltage based on an oscillator signal, (2) oscillator circuitry operative to generate the oscillator signal based on a variable positive supply voltage derived from the fixed positive supply voltage such that fluctuations in the variable positive supply voltage result in corresponding changes of the negative supply voltage, and (3) a regulator operative to generate the variable positive supply voltage in response to the negative supply voltage to maintain the negative supply voltage at substantially a target regulated value.

2. A power stage according to claim 1, wherein the normally on FET is a silicon carbide junction FET.

3. A power stage according to claim 1, wherein the low-side switching device of the gate drive circuit comprises a light-sensitive switch.

4. A power stage according to claim 1, further comprising a diode-capacitor network connected between the negative supply voltage and the ground reference of the power stage to generate a negative voltage at the negative supply input of the gate drive circuit.

5. A power stage according to claim 4 wherein:
the diode-capacitor network is a first diode-capacitor network; and
the gate drive circuit has a positive supply input and a high-side switching device coupled between the control output and the positive supply input, the high-side switching device being operative to drive the voltage of the gate node of the normally on FET to substantially a value of a positive supply voltage coupled to the positive supply input in response to the switching control signal, the positive supply voltage being sufficiently positive with respect to the ground reference of the power stage to permit the normally on FET to conduct;
and further comprising a second diode-capacitor network connected between a positive supply voltage and the ground reference of the power stage to generate the positive voltage at the positive supply input of the gate drive circuit.

6. A power stage for providing switched electrical power to a load, comprising:
first and second normally on field-effect transistors (FETs) each having a gate node and a high-current source-drain channel, the source-drain channel of the first normally on FET being connected between a positive supply voltage of the power stage and the load, and the source-drain channel of the second normally on FET being connected between the load and a ground reference of the power stage;
first and second gate drive circuits each having respective first and second supply inputs and a respective control output, the control output of the first gate drive circuit being coupled to the gate node of the first normally on FET, and the control output of the second gate drive circuit being coupled to the gate node of the second normally on FET, each of the gate drive circuits including switching devices coupled between the supply inputs and the control output of the gate drive circuit, the switching devices of each gate drive circuit being operative in response to respective switching control signals supplied to the gate drive circuit to drive a voltage of the gate node of the respective normally on FET to substantially a value of a respective one of first and second supply voltages supplied to the gate drive circuit on the respective first and second supply inputs, the second supply voltage supplied to the second gate drive circuit being substantially a negative supply voltage of the power stage sufficiently negative with respect to the ground reference of the power stage to substantially turn off the second normally on FET when applied to the gate node of the second normally on FET by the second gate drive circuit;
a positive bias circuit operative to generate, from the positive supply voltage of the power stage, the first and second supply voltages of the first gate drive circuit and the first supply voltage of the second gate drive circuit;
a regulated charge pump circuit operative to generate the negative supply voltage of the power stage from the positive supply voltage of the power stage, the regulated charge pump circuit including (1) storage and switching circuitry operative to generate the negative supply voltage of the power stage based on an oscillator signal, (2) oscillator circuitry operative to generate the oscillator signal based on a variable positive supply voltage derived from the fixed positive supply voltage such that fluctuations in the variable positive supply voltage result in corresponding changes of the negative supply voltage of the power stage, and (3) a regulator operative to generate the variable positive supply voltage in response to the negative supply voltage of the power stage to maintain the negative supply voltage of the power stage at substantially a target regulated value.

7. A power stage according to claim 6, further comprising first through fourth diode-capacitor networks, the first diode-capacitor network being connected between the negative supply voltage of the power stage and the ground reference of the power stage to generate the second supply voltage at the second supply input of the second gate drive circuit, the second diode-capacitor network connected between the positive bias circuit and the ground reference of the power stage to develop the first supply voltage at the first supply input of the second gate drive circuit, the third diode-capacitor network connected between the positive bias circuit and the load to develop the second supply voltage at the second supply input of the first gate drive circuit, and the fourth diode-capacitor network connected between the positive bias circuit and the load of the power stage to develop the first supply voltage at the first supply input of the first gate drive circuit.

8. The power stage of claim 1, wherein the regulator includes:
a first field-effect transistor (FET) having a gate node and having a source-drain channel coupled between the fixed positive supply voltage and the variable positive supply voltage; and
a second FET having a gate node coupled to the ground reference and having a source-drain channel coupled between the gate node of the first FET and the negative supply voltage.

9. The power stage of claim 1, wherein the storage and switching circuitry, the oscillator circuitry, and the regulator all include additional normally on FETs and biasing circuitry operative to generate operating voltages for the additional normally on FETs to ensure that the additional normally on FETs are turned completely off in operation.

* * * * *